United States Patent [19]

Hishon

[11] Patent Number: 5,257,754
[45] Date of Patent: Nov. 2, 1993

[54] RETRACTOR

[75] Inventor: Michael K. Hishon, New Baltimore, Mich.

[73] Assignee: TRW Vehicle Safety Systems Inc., Lyndhurst, Ohio

[21] Appl. No.: 731,521

[22] Filed: Jul. 17, 1991

[51] Int. Cl.$^5$ .................... B65M 75/48; B60R 22/36
[52] U.S. Cl. .................... 242/107.40 R; 242/107.40 A
[58] Field of Search ......... 242/107, 107.4 R, 107.4 A, 242/107.4 B, 107.4 C, 107.4 D, 107.4 E; 280/806, 807, 808

[56] References Cited

U.S. PATENT DOCUMENTS

| | | | |
|---|---|---|---|
| 3,598,336 | 1/1970 | Frost | 242/107.4 D |
| 3,880,379 | 4/1975 | Booth | 242/107.4 R |
| 4,436,255 | 3/1984 | Matsui et al. | 242/107.4 A |
| 4,518,132 | 5/1985 | Schmidt | 242/107.4 A |
| 4,552,319 | 11/1985 | Gavagan et al. | 242/107.4 A |
| 4,555,075 | 11/1985 | Schmidt et al. | 242/107.4 A |
| 4,573,646 | 3/1986 | Willey | 242/107.4 A |
| 4,583,701 | 4/1986 | Matsui et al. | 242/107.4 A |
| 4,597,546 | 7/1986 | Yamamoto et al. | 242/107.4 A |
| 4,717,089 | 1/1988 | Tamura | 242/107.4 A |
| 4,726,539 | 2/1988 | Schmidt et al. | 242/107.4 A |
| 4,729,524 | 3/1988 | Betorf et al. | 242/107.4 A X |
| 4,811,912 | 3/1989 | Takada | 242/107.4 B |
| 4,858,847 | 8/1989 | Ogris | 242/107.4 C X |
| 4,991,874 | 2/1991 | Tsuge et al. | 242/107.4 A X |
| 5,014,926 | 5/1991 | Rumpf et al. | 242/107.4 A |

FOREIGN PATENT DOCUMENTS 2504576 8/1975 Fed. Rep. of Germany ... 242/107.4 R

Primary Examiner—Daniel P. Stodola
Assistant Examiner—John P. Darling
Attorney, Agent, or Firm—Tarolli, Sundheim & Covell

[57] ABSTRACT

A seat belt retractor has a rotatable spindle from which a seat belt is unwound. During rotation of the spindle, a cam member is rotated by a gear assembly at a speed which is less than the speed of rotation of the spindle. After a predetermined amount of the seat belt has been unwound from the spindle, the cam member moves an actuator member from an unactuated position to an actuated position to effect movement of a locking pawl into engagement with a ratchet wheel. The locking pawl engages the ratchet wheel to block rotation of the spindle in a belt unwinding direction. A detent engages the actuator member to releasably hold the actuator member in its unactuated and actuated positions. The actuator member has a cam follower section which is received in a cam track on the cam member. The cam track has cam surfaces which engage the cam follower section of the actuator member to move the actuator member between its unactuated and actuated positions. Movement of the actuator member to its actuated position moves a spring member to effect movement of the locking pawl into engagement with the ratchet wheel.

12 Claims, 5 Drawing Sheets

RETRACTOR

BACKGROUND OF THE INVENTION

The present invention relates to a vehicle seat belt retractor, and more specifically to a seat belt retractor having a locking pawl which is moved into engagement with a ratchet wheel to block seat belt unwinding rotation of a spindle in response to unwinding of a predetermined amount of the seat belt from the spindle.

A known retractor having a locking pawl which is moved into engagement with a ratchet wheel to block unwinding rotation of a spindle in response to unwinding of a predetermined amount of a seat belt from the spindle is disclosed in U.S. Pat. No. 4,726,539. The retractor disclosed in this patent has a ring gear which is rotated during unwinding of the seat belt. A pair of tabs are formed on the outside of the ring gear. Upon extension of a predetermined amount of the seat belt, one of the tabs engages an arm on a mode switching lever to pivot the lever. Pivotal movement of the switching lever actuates an overcenter spring to move a locking pawl into engagement with a ratchet wheel to block rotation of the spindle in a seat belt unwinding direction. Upon winding of almost the entire length of the seat belt back onto the spindle, a second arm on the switching lever is engaged by a second tab connected with the ring gear. The second tab pivots the switching lever and actuates the overcenter spring to move the locking pawl out of engagement with the ratchet wheel.

SUMMARY OF THE INVENTION

The retractor of the present invention has a rotatable spindle from which a seat belt is unwound during extension of the seat belt and around which the seat belt is wound during retraction of the seat belt. During rotation of the spindle to extend the seat belt, a gear assembly rotates a cam member. An actuator member is movable by the cam member from an unactuated position to an actuated position to effect movement of a locking pawl into engagement with a ratchet wheel in response to a predetermined amount of rotation of the spindle in the seat belt unwinding direction. The actuator member is also movable by the cam member from the actuated position to the unactuated position to enable the locking pawl to move out of engagement with the ratchet wheel in response to a predetermined amount of rotation of the spindle in the seat belt winding direction.

In accordance with one of the features of the present invention, a detent has a first portion which engages the actuator member to hold the actuator member in the unactuated position. A second portion of the detent engages the actuator member to hold the actuator member in the actuated position. In accordance with another feature of the invention, the actuator member has a cam follower section which is received in a cam track and engages cam surfaces to move the actuator member between the actuated and unactuated positions. In accordance with still another feature of the invention, a spring is movable by movement of the actuator member to the actuated position to effect movement of the locking pawl into engagement with the ratchet wheel.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
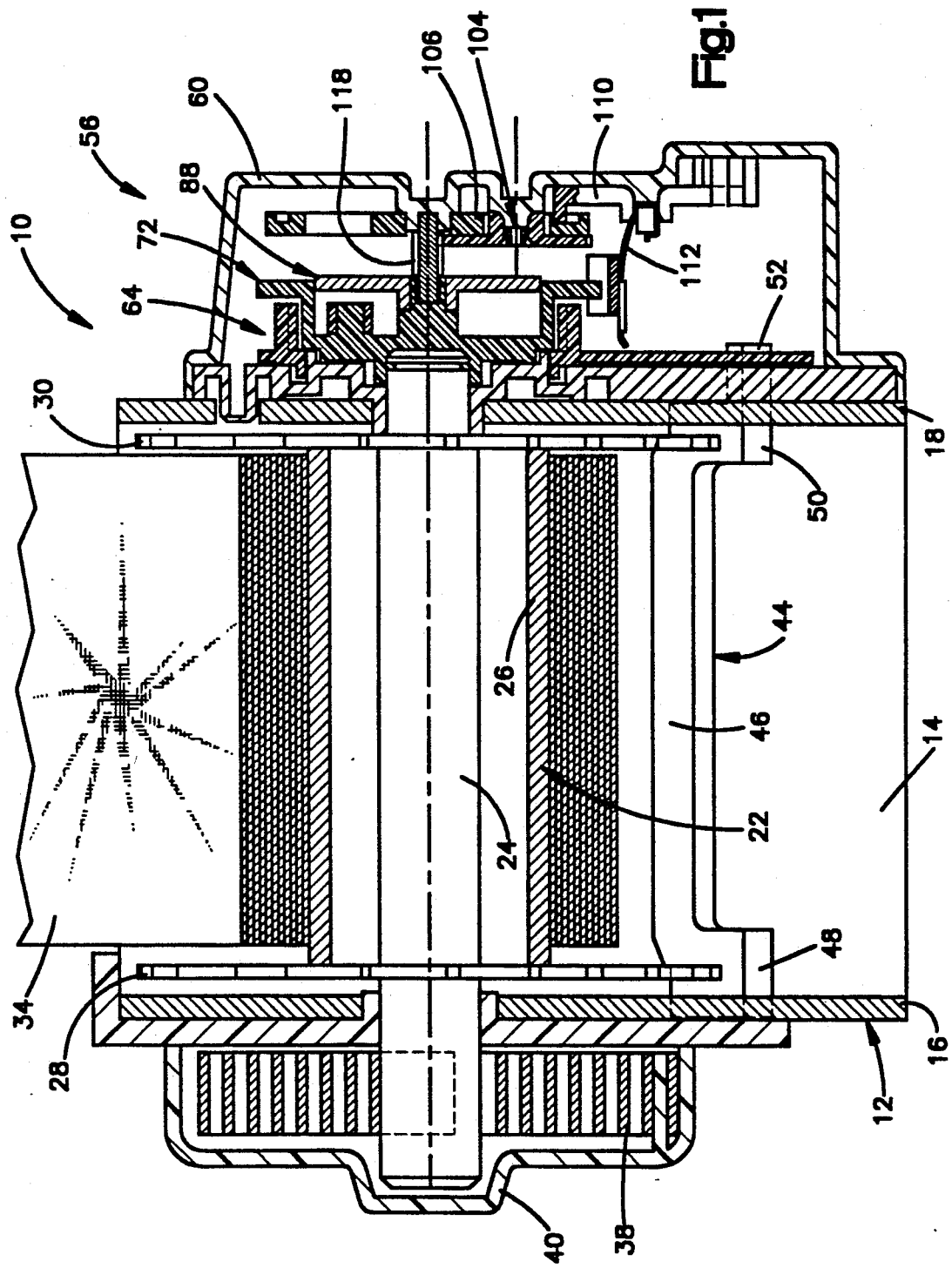
FIG. 1 is a longitudinal sectional view of a seat belt retractor embodying the present invention and with parts removed.

The present invention relates to a vehicle seat belt retractor. The seat belt retractor may be of many different constructions. As representative of the present invention, a vehicle seat belt retractor 10 is illustrated in FIG. 1.

The vehicle seat belt retractor 10 (FIG. 1) includes a metal frame 12 which is adapted to be fixed to a vehicle. The frame 12 includes a base 14 and sides 16 and 18. A spindle 22 is rotatably supported by the sides 16 and 18 of the frame 12.

The spindle 22 includes a central shaft 24 and a reel 26 which circumscribes the shaft 24. The reel 26 is connected to a pair of locking ratchet wheels 28 and 30. The locking ratchet wheels 28 and 30 are fixed to the shaft 24. A seat belt 34 is wound around the reel 26. The spindle 22 is rotatable in a belt extension or unwinding direction and in a belt retraction or winding direction.

A rewind spring 38 is connected to one end of the spindle shaft 24 and to a spring cover 40 secured to the side 16 of the frame 12. The rewind spring 38 acts between the spring cover 40 and the spindle shaft 24 to bias the spindle 22 to rotate in the belt retraction or winding direction.

A metal locking pawl or bar 44 has a central portion 46 which extends between a pair of locking portions 48 and 50. A locking bar projection or finger 52 extends from one end (the right end as viewed in FIG. 1) of the locking bar 44. The locking bar 44 is pivotally supported in openings (not shown) formed in the sides 16 and 18 of the frame 12. The locking portions 48 and 50 of the locking bar 44 are movable into engagement with the ratchet wheels 28 and 30 to block rotation of the spindle 22 in the unwinding direction.

Figure 2:
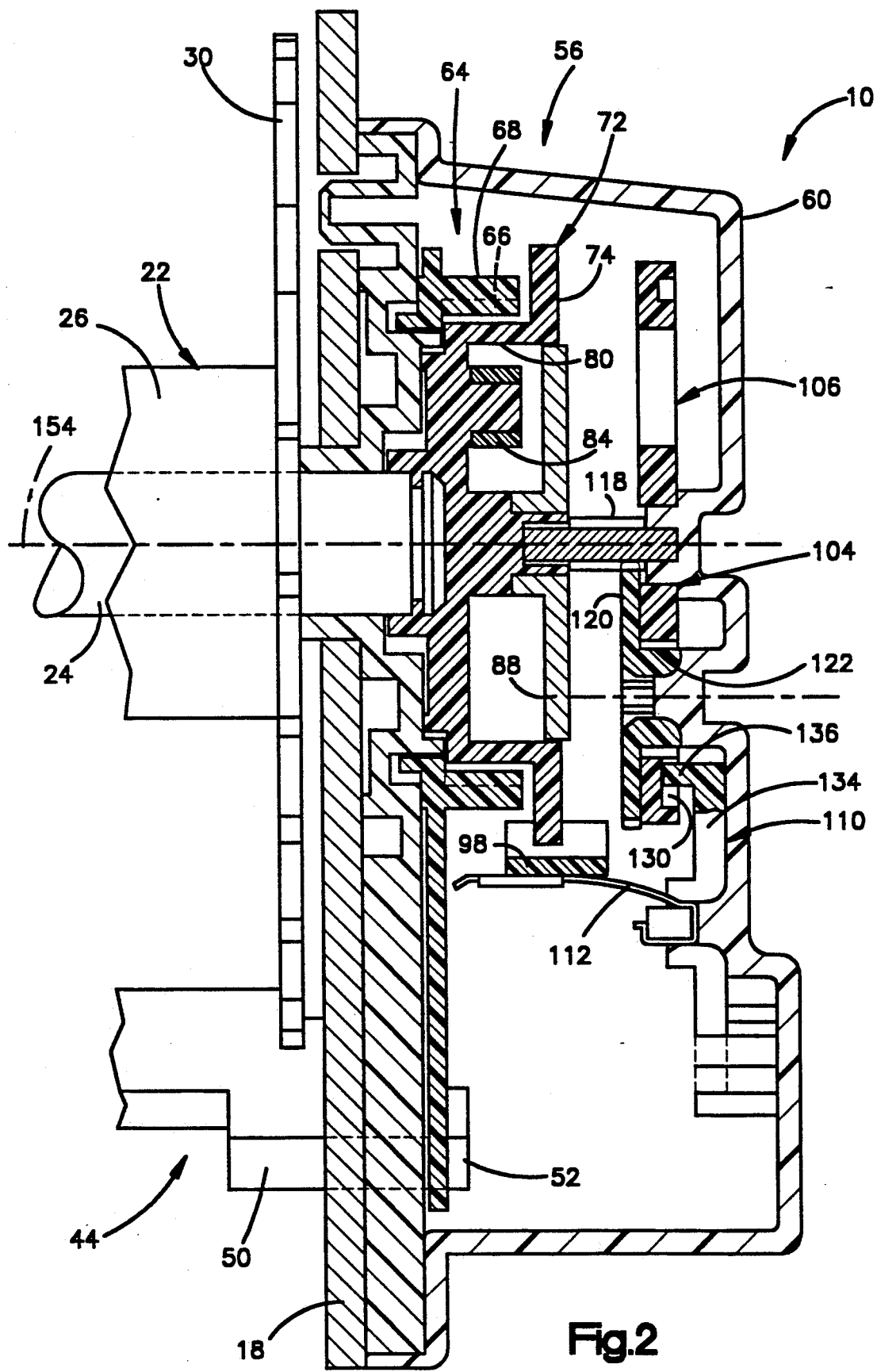
FIG. 2 is an enlarged view of a portion of the retractor of FIG. 1.

An actuator assembly 56 is connected with the side 18 of the frame 12 and is enclosed by a cover 60. The actuator assembly 56 includes a lock bar actuator 64 having a slot into which the locking bar finger 52 extends. The lock bar actuator 64 has a plurality of internal teeth 66 on the interior of a cylindrical outer wall 68 (FIG. 2). The lock bar actuator 64 is pivotable relative to the side 18 of the frame to move the locking portions 48 and 50 of the locking bar 44 into engagement with the ratchet wheels 28 and 30 (FIG. 1). A spring (not shown) biases the lock bar actuator 64 to a position in which the locking bar 44 is disengaged from the ratchet wheels 28 and 30.

An actuator ratchet 72 (FIG. 2) is disposed adjacent to the lock bar actuator 64. The actuator ratchet 72 has a radially extending disk portion 74. The actuator ratchet 72 is fixed to the spindle shaft 24 for rotation with the spindle shaft during winding or unwinding of the seat belt 34 onto or from the spindle 22. Thus, the actuator ratchet 72 rotates with the spindle 22 at the same speed as the spindle:

The actuator ratchet 72 has an annular array of ratchet teeth 76 (FIG. 3) which are formed on the radially outer periphery of the disk portion 74. A cylindrical wall 80 (FIG. 2) extends axially inwardly from the circular disk portion 74 of the actuator ratchet 72. The cylindrical wall 80 is formed with a plurality of openings (not shown) through which a control pawl, a portion of which is indicated at 84 (FIG. 2), is movable.

A flyweight 88, made of a relatively heavy material, is supported on the actuator ratchet 72 for rotation relative to the actuator ratchet. A pair of circumferentially spaced control pins (not shown) are positioned on the perimeter of the circular flyweight 88 and engage the control pawl 84.

The lock bar actuator 64 is pivoted to pivot the locking bar 44 into engagement with the locking ratchet wheels 28 and 30 in response to withdrawal of the belt 34 of the spindle 22 at a rate of acceleration above a predetermined rate. Withdrawal of the belt 34 from the spindle 22 at a rate above the predetermined rate causes rapid acceleration of the spindle and the actuator ratchet 72. The flyweight 88 also rotates, but lags behind rotation of the spindle 22 and actuator ratchet 72. The flyweight control pins retard rotation of the control pawl 84 to pivot the control pawl through an opening in the cylindrical side wall 80 of the actuator ratchet 72 into engagement with the internal teeth 66 on the outer wall 68 of the lock bar actuator 74. Thereafter, the control pawl 84 transmits rotational force from the spindle 22 to the lock bar actuator 64 to rotate the lock bar actuator and thereby cam the locking bar 44 into engagement with the ratchet wheels 28 and 30.

The actuator assembly 56 also includes a vehicle deceleration sensing inertia weight 92 (FIG. 3), which may be, for example, a steel ball. The inertia weight 92 rests in a cavity in a sensor housing 94. The sensor housing 94 is connected with the frame 12. A sensor lever 96 is pivotally mounted on the sensor housing 94 and rests upon the inertia weight 92. A portion of the sensor lever 96 extends upwardly into engagement with a generally L-shaped lock-up lever 98. The lock-up lever 98 is mounted on the lock bar actuator 64 (FIG. 2) and is pivotable into engagement with the ratchet teeth 76 (FIG. 3) formed on the outer perimeter of the actuator ratchet 72.

When the vehicle in which the retractor 10 is mounted is not decelerating at a rate above a predetermined rate, the inertia weight 92 rests at the bottom of the cavity in the sensor housing 94. When the inertia weight 92 is in this position, the lock-up lever 98 is spaced from the teeth 76 on the actuator ratchet 72. Upon deceleration of the vehicle at a rate above the predetermined rate, the inertia weight 92 moves relative to the sensor housing 94. Movement of the inertia weight 92 pivots the sensor lever 96 upward from the position shown in FIG. 3. This upward movement of the sensor lever 96 presses the lock-up lever 98 upward.

The lock-up lever 98 pivots upward and moves into engagement with the circular disk portion 74 of the actuator ratchet 72. Rotation of the spindle 22 and actuator ratchet 72 causes the next available tooth 76 to engage the lock-up lever 98. Thereafter, the lock-up lever 98 transmits rotational force from the actuator ratchet 72 to the lock bar actuator 64. This causes the lock bar actuator 64 to pivot and thereby cam the locking bar 44 into engagement with the ratchet wheels 28 and 30 to block rotation of the spindle 22 in the belt withdrawal direction.

The construction of the lock bar actuator 64, actuator ratchet 72, and flyweight 88 and the manner in which they cooperate with the lock-up lever 98 and inertia mass 92 is the same as is disclosed in U.S. Pat. No. 5,014,926 issued May 14, 1991 and entitled "Web Sensitive and Vehicle Sensitive Retractor". Therefore, the construction and mode of operation of the lock bar actuator 64, actuator ratchet 72, flyweight 88, and inertia mass 92 will not be further described herein.

In addition to being moved into engagement with the ratchet wheels 28 and 30 when the vehicle encounters sudden deceleration and when the belt 34 is withdrawn from the retractor 10 at an excessive rate, the locking bar is moved into engagement with the ratchet wheels 28 and 30 in response to withdrawal of a predetermined amount of the belt from the retractor. During withdrawal of the belt 34 from the retractor 10, a reduction gear assembly 104 (FIGS. 3 and 5) rotates a cam member 106 at a relatively slow speed about the central axis of the spindle 22. After a predetermined length of the belt 34 has been withdrawn from the retractor 10, the cam member 106 pivots an actuator lever 110 from an unactuated position shown in FIG. 3 to an actuated position shown in FIG. 4.

Figure 3:
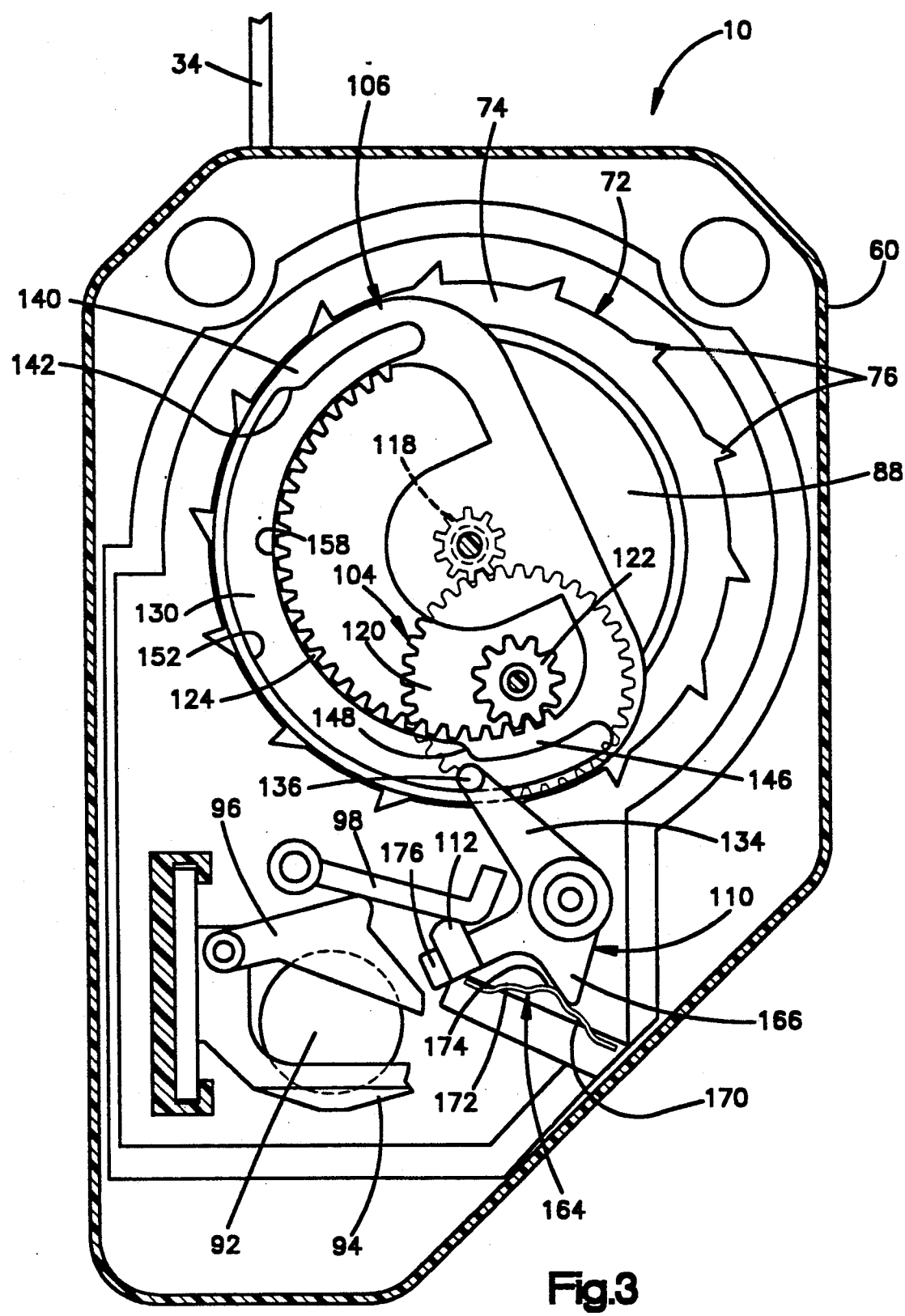
FIG. 3 is a schematic illustration showing parts of the retractor of FIG. 1 in one position.
Figure 4:
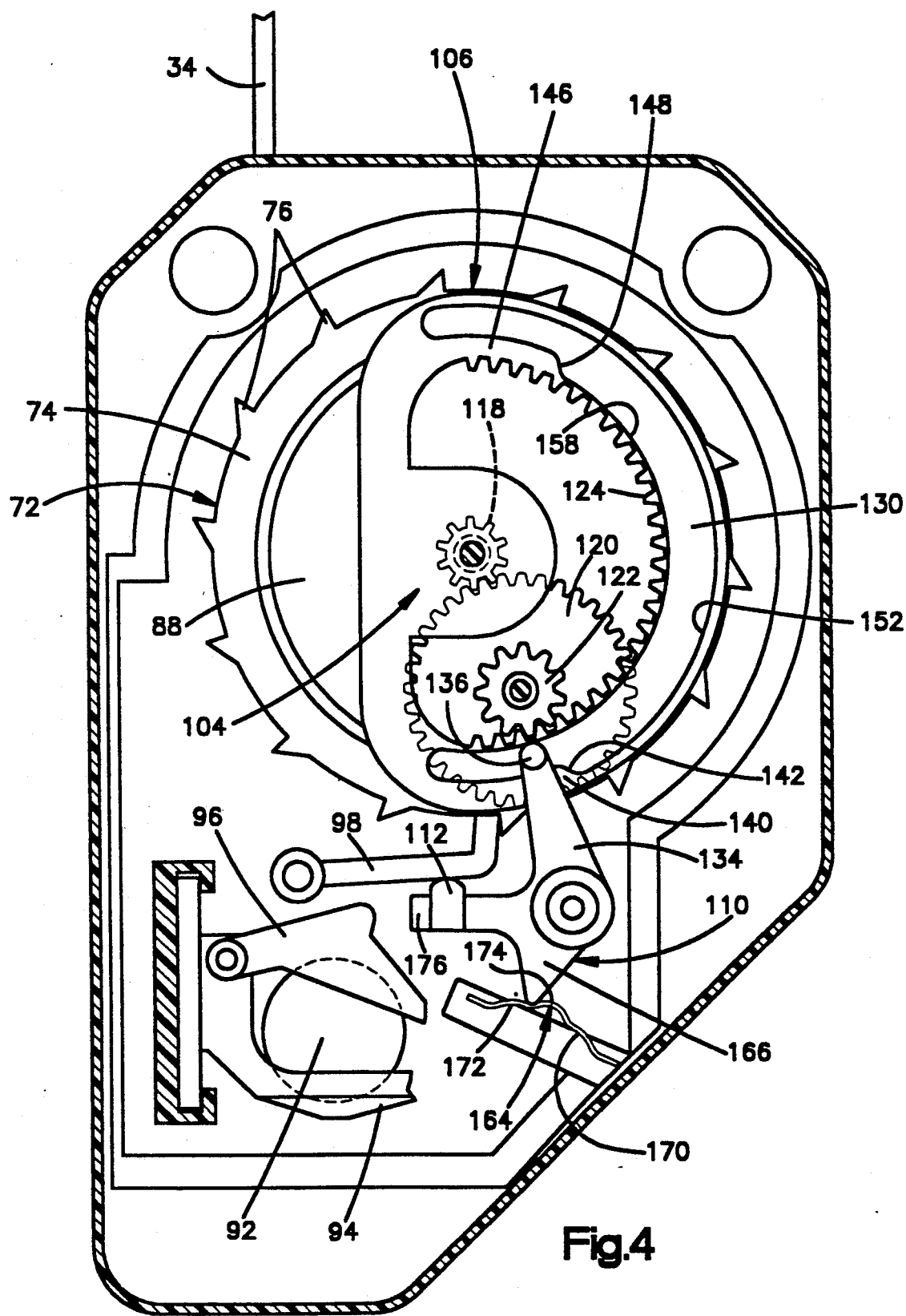
FIG. 4 is a schematic illustration, generally similar to FIG. 3, showing parts of the retractor in a different position.
Figure 5:
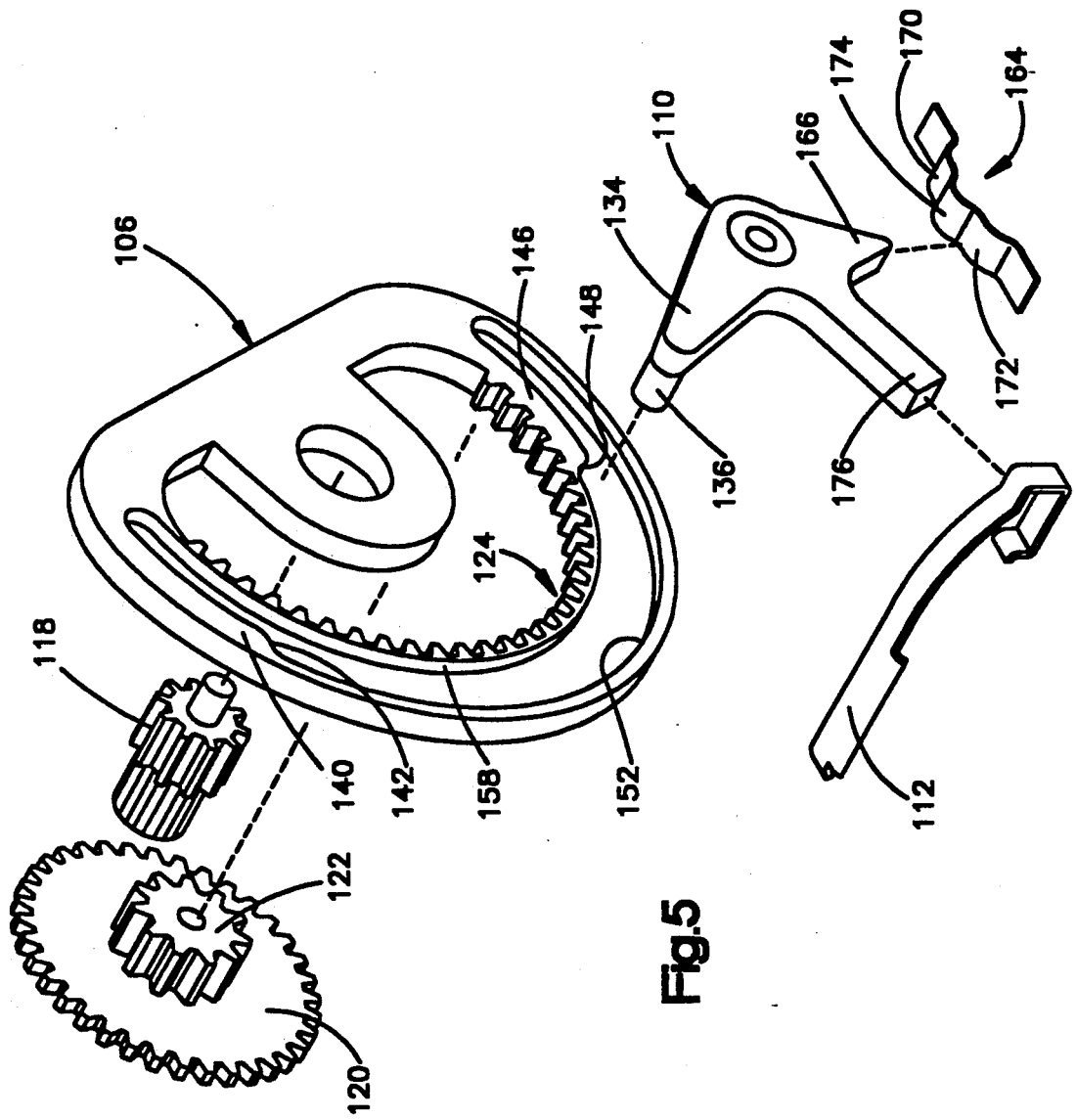
FIG. 5 is an exploded view illustrating the construction of certain parts of the retractor of FIG. 1.

As the actuator lever 110 moves to the actuated position, a leaf spring member 112 (FIGS. 4 and 5) lifts the lock-up pawl 98 upwardly from a disengaged position shown in FIG. 3 to an engaged position shown in FIG. 4. When the lock-up pawl 98 is in the engaged position, it engages a tooth 76 on the outer periphery of the actuator ratchet 72. The next increment of rotation of the spindle 22 and actuator ratchet 72 results in the transmission of force from the actuator ratchet 72 through the lock-up pawl 98 to the lock bar actuator 64 upon which the lock-up pawl 98 is pivotally mounted. This force causes the lock bar actuator 64 to pivot about the central axis of the spindle 22 and to move the locking bar 44 into engagement with the ratchet wheels 28 and 30 to block rotation of the spindle 22 in the belt unwinding direction.

During subsequent retraction of the belt 34 and rotation of the spindle 22 and actuator ratchet 72 in the belt winding direction, the actuator lever 110 maintains the lock-up pawl 98 in the engaged position shown in FIG. 4. As the actuator ratchet 72 rotates in a counterclockwise (as viewed in FIG. 4) direction, the teeth on the actuator ratchet move past the end of the lock-up lever 98. After the belt 34 has been almost completely rewound onto the spindle 22, the cam member 106 pivots the actuator lever 110 from the actuated position of FIG. 4 back to the unactuated position of FIG. 3. This permits the lock-up lever 98 to fall out of engagement with the actuator ratchet 72. Thereafter, the belt 34 can again be unwound from the spindle 22.

The reduction gear assembly 104 includes a main drive pinion 118 (FIGS. 2, 3 and 5) having an end portion which is rotatably supported by the cover 60 (FIG. 2). The main drive pinion 118 is fixed to the actuator ratchet 72 for rotation with the actuator ratchet and spindle 22. The main drive pinion 118 is also disposed in meshing engagement with a large intermediate gear 120 (FIGS. 2 and 3) which is rotatably supported by the cover 60. The large intermediate gear 120 is integrally formed with a small intermediate gear 122. The small intermediate gear 122 is disposed in meshing engagement with an arcuate gear segment 124 formed on the cam member 106. The cam member 106 is rotatably supported by the cover 60 for rotation about the central axis 154 of the spindle 22.

Upon rotation of the spindle 22 in the belt unwinding direction, the main drive pinion 118 rotates in a clockwise direction as viewed in FIG. 3. The clockwise rotation of the main drive pinion 118 results in the large and small intermediate gears 120 and 122 rotating in a counterclockwise direction (as viewed in FIG. 3). The counterclockwise rotation of the small intermediate gear 122 drives the arcuate gear segment 124 to rotate the cam member 106 in a counterclockwise direction from the position shown in FIG. 3 toward the position shown in FIG. 4 as the belt 34 is unwound from the spindle 22.

The reduction gear assembly 104 rotates the cam member 106 about the central axis 154 of the spindle 122 at a slower speed than and in a direction opposite to the direction of rotation of the spindle 22. During rotation of the spindle 22 through a substantial number of revolutions, sufficient to enable almost the entire length of the belt 34 to be unwound from the spindle 22, the reduction gear assembly 104 is effective to rotate the cam member 106 through less than half of a revolution.

Upon rewinding of the belt 34 onto the spindle 22, the reduction gear assembly 104 rotates the cam member 106 from the position shown in FIG. 4 back to the position shown in FIG. 3. Thus, as the belt 34 is wound back onto the spool 22, the main drive pinion 118 is rotated in a counterclockwise direction (as viewed in FIGS. 3 and 4). This effects rotation of the large and small intermediate gears 120 and 122 in a clockwise direction (as viewed in FIGS. 3 and 4). The clockwise rotation of the small intermediate gear 122 drives the arcuate gear segment 124 to rotate the cam member 106 in a clockwise direction about the central axis 154 of the spindle 22. When the belt 34 has been completely wound onto the spindle 22, the reduction gear assembly 104 will have rotated the cam member 106 back to the position shown in FIG. 3.

An arcuate cam track 130 on the cam member 106 cooperates with the actuator lever 110 to move the actuator lever 110 between the unactuated position shown in FIG. 3 and the actuated position shown in FIG. 4. The arcuate cam track 130 is disposed radially outward of the arcuate gear segment 124 and has the same radius of curvature as the arcuate gear segment. The actuator lever 110 has an actuator arm 134 with an axially projecting follower section 136 (FIG. 2). The follower section 136 of the actuator arm 134 is received in the cam track 130.

A first cam lobe 140 (FIG. 3) is located at one end of the cam track 130. The first cam lobe 140 has a cam surface 142 which engages the follower section 136 of the actuator lever 110 to pivot the actuator lever from the unactuated position shown in FIG. 3 to the actuated position shown in FIG. 4. This occurs after the belt 34 has been almost completely unwound from the spindle 22 and while the cam member 106 is being rotated in a counterclockwise direction (as viewed in FIGS. 3 and 4) by the reduction gear assembly 104.

Similarly, a second cam lobe 146 is located at the opposite end of the cam track 130. The second cam lobe 146 has a cam surface 148 which engages the follower section 136 of the actuator lever 110 to pivot the actuator lever from the actuated position shown in FIG. 4 to the unactuated position shown in FIG. 3. This occurs after the belt 34 has been almost completely wound onto the spindle 22 and while the cam member 106 is being rotated in a clockwise direction (as viewed in FIGS. 3 and 4).

The cam track 130 has an outer constant radius section 152. The outer constant radius section 152 of the cam track 130 has a center of curvature which is coincident with the axis 154 (FIG. 2) about which the spindle 22 and cam member 106 rotate. The constant radius section 152 of the cam track 130 is engaged by the follower section 136 of the actuator lever 110 as the belt 34 is unwound from the spindle 22.

When the follower section 136 of the actuator lever 110 is engaged by the cam surface 142 during unwinding of the belt 34 from the spindle 22, the actuator lever 110 is pivoted in a clockwise direction from the unactuated position shown in FIG. 3 to the actuated position shown in FIG. 4. As the actuator lever 110 is pivoted from the unactuated position to the actuated position, the follower section 136 of the actuator lever 110 moves out of engagement with the outer constant radius section 152 of the cam track 130 and into engagement with an inner constant radius section 158 of the cam track. As this occurs, the lock-up lever 98 is moved into engagement with the actuator ratchet 72. Continued rotation of the spindle 22 and actuator ratchet 72 in the belt unwinding direction pivots the lock bar actuator 64 about the spindle axis 154. This effects movement of the locking bar 44 into engagement with the ratchet wheels 28 and 30. The locking bar 44 then cooperates with the ratchet wheels 28 and 30 to block further rotation of the spindle 22 in the belt unwinding direction.

When the belt 34 is to be retracted, the wind-up spring 38 rotates the spindle 22 and winds the belt around the spindle. As the belt 34 is wound around the spindle 22, the reduction gear assembly 104 rotates the cam member 106 in a clockwise direction from the position shown in FIG. 4 toward the position shown in FIG. 3. As the cam member 106 is rotated toward the position shown in FIG. 3, the follower section 136 of the actuator lever 110 engages the inner constant radius section 158 of the cam track 130. The inner constant radius section 158 of the cam track 130 has a center of curvature which is located on the spindle axis 154.

The follower section 136 of the actuator lever 110 remains in engagement with the inner constant radius section 158 of the cam track 130 and spaced from the outer constant radius section 152 of the cam track until the follower section 136 engages the cam surface 148 on the cam lobe 146. When the follower section 136 engages the cam surface 148 on the cam lobe 146, the cam surface 148 pivots the actuator lever 110 in a counterclockwise direction from the position shown in FIG. 4 to the position shown in FIG. 3. As this occurs, the follower section 136 of the actuator lever 110 moves out of engagement with the inner constant radius section 158 of the cam track 130 and into engagement with the outer constant radius section 152 of the cam track. The leaf spring 112 moves downward with the actuator lever 110 and permits the lock-up lever 98 to drop downward out of engagement with the actuator ratchet 72. Therefore, as the next increment of the belt 34 is wound onto the spindle 22, the locking bar 44 is spring biased downward out of engagement with the ratchet wheels 28 and 30.

A detent spring 164 cooperates with a detent arm 166 on the actuator lever 110 to maintain the actuator lever 110 in the unactuated position shown in FIG. 3 during movement of the follower portion 136 of the actuator lever along the outer constant radius section 152 of the cam track 130. In addition, the detent spring 164 cooperates with the detent arm 166 to maintain the actuator lever 110 in the actuated position shown in FIG. 4 during movement of the follower portion 136 of the actuator lever along the inner constant radius section 158 of the cam track 130. The detent spring 164 has a first portion 170 which engages the detent arm 166 when the actuator lever 110 is in the unactuated position of FIG. 3. The detent spring 164 has a second portion 172 which engages the detent arm 166 when the actuator lever 110 is in the engaged position of FIG. 4. The detent spring has a third portion 174 (FIG. 5) which is intermediate portions 170, 172 and which projects above portions 170, 172. The portion 174 is depressed by the actuator lever 110 to allow the actuator lever 110 to move between portions 170, 172.

The leaf spring 112 (FIGS. 2 and 5) transmits force from the actuator lever 110 to the lock-up lever 98 to move the lock-up lever from the disengaged position of FIG. 3 to the engaged position of FIG. 4. One end of the leaf spring 112 is wrapped around an actuator arm 176 of the actuator lever 110. The opposite end of the leaf spring extends beneath the lock-up lever 98. Upon movement of the actuator lever 110 from the unactuated position part way toward the actuated position of FIG. 4, the leaf spring 112 moves the lock-up lever 98 upwardly into engagement with the actuator ratchet 72. Continued movement of the actuator lever 110 toward the actuated position results in the leaf spring 112 being resiliently deflected and the lock-up lever being pressed against the actuator ratchet 72 by the leaf spring 112.

The cam member 106, main drive pinion 118, intermediate gears 120, 122 and the actuator lever 110 are all rotatably mounted on the cover 160. This facilitates positioning of the cam member 106, main drive pinion 118, intermediate gear 104 and actuator lever 110 relative to the actuator ratchet 72 and lock bar actuator 64 during assembly of the retractor 110.

From the above description of the invention, those skilled in the art will perceive improvements, changes and modifications. Such improvements, changes and modifications within the skill of the art are intended to be covered by the appended claims.

Having described the invention, the following is claimed:

1. A seat belt retractor comprising:
   a frame;
   a rotatable spindle supported by said frame and from which a seat belt is unwound during extension of the seat belt and around which the seat belt is wound during retraction of the seat belt;
   a ratchet wheel connected to said spindle for rotation therewith;
   a locking pawl movable from a disengaged position to an engaged position engaging said ratchet wheel to block rotation of said spindle in the unwinding direction;
   a rotatable cam member;
   gear means for rotating said cam member at a speed which is less than the speed of rotation of said spindle during rotation of said spindle;
   an actuator member movable by said cam member from an unactuated position to an actuated position to effect movement of said locking pawl into engagement with said ratchet wheel in response to a predetermined amount of rotation of said spindle in the unwinding direction, said actuator member being movable by said cam member from the actuated position to the unactuated position to enable movement of said locking pawl out of engagement with said ratchet wheel in response to rotation of said spindle in the winding direction; and
   detent means having first and second end portions supported on said frame, said first and second end portions of said detent means being fixed relative to said frame and relative to each other, said detent means also having a first portion intermediate said first and second end portions for engaging said actuator member and holding said actuator member in the unactuated position and a second portion intermediate said first and second end portions for engaging said actuator member and holding said actuator member in the actuated position.

2. A seat belt retractor as set forth in claim 1 wherein said cam member includes an arcuate cam track, said actuator member having a cam follower section which is received in said cam track, said cam track having first surface means for engaging said cam follower section of said actuator member to move said actuator member from its unactuated position to its actuated position upon occurrence of the predetermined amount of rotation of said spindle in the unwinding direction, said cam track having second surface means for engaging said cam follower section of said actuator member to move said actuator member from its actuated position to its unactuated position upon occurrence of rotation of said spindle in the winding direction.

3. A seat belt retractor as set forth in claim 1 further including spring means for transmitting force from said actuator member to effect movement of said locking pawl from its disengaged position to its engaged position.

4. A seat belt retractor as set forth in claim 1 wherein said cam member includes an arcuate cam track, said gear means including an arcuate gear segment which extends along said cam track.

5. A seat belt retractor as set forth in claim 1 wherein said detent means includes a spring member, said first portion of said detent means including a first segment of said spring member, said second portion of said detent means including a second segment of said spring member.

6. A seat belt retractor as set forth in claim 5 wherein said actuator member includes a detent arm which is movable along said spring member upon movement of said actuator member by said cam member, said detent arm engaging said first segment of said spring member when said actuator member is in its unactuated position, said detent arm engaging said second segment of said spring member when said actuator member is in its actuated position.

7. A seat belt retractor as set forth in claim 6 wherein said cam member includes an arcuate cam track having a first side wall with a first constant radius portion and a first lobe portion at a first end of said cam track, said cam track having a second side wall with a second constant radius portion and a second lobe portion at a second end of said cam track, said actuator member including a cam follower arm which engages said first constant radius portion of said cam track during rotation of said spindle in the unwinding direction, said cam follower arm being moved into engagement with said second constant radius portion of said cam track by said first lobe portion upon occurrence of the predetermined amount of rotation of said spindle in the unwinding direction, said cam follower arm engaging said second constant radius portion of said cam track during rotation of said spindle in the winding direction, said cam follower being moved into engagement with said first constant radius portion of said cam track by said second lobe portion upon occurrence of rotation of said spindle in the winding direction.

8. A seat belt retractor comprising:
   a rotatable spindle from which a seat belt is unwound during extension of the seat belt and around which the seat belt is wound during retraction of the seat belt;
   a ratchet wheel connected to said spindle for rotation therewith;
   a locking pawl movable from a disengaged position to an engaged position engaging said ratchet wheel to block rotation of said spindle in the unwinding direction;
   a rotatable cam member;
   gear means for rotating said cam member at a speed which is less than the speed of rotation of said spindle during rotation of said spindle;
   an actuator member movable by said cam member from an unactuated position to an actuated position in response to a predetermined amount of rotation of said spindle in the unwinding direction, said actuator member being movable by said cam member from its actuated position to its unactuated position in response to rotation of said spindle in the unwinding direction; and
   spring means movable by movement of said actuator member to its actuated position and engaging said locking pawl to effect movement of said locking pawl into engagement with said ratchet wheel, said spring means being movable by movement of said actuator member to its unactuated position to enable said locking pawl to move out of engagement with said ratchet wheel;
   said spring means including a longitudinally extending leaf spring which is resiliently deflected along its longitudinal axis upon movement of said actuator member from its unactuated position to its actuated position.

9. A seat belt retractor as set forth in claim 8 further including detent means having a first portion for engaging said actuator member and holding said actuator member in its unactuated position and a second portion for engaging said actuator member and holding said actuator member in its actuated position.

10. A seat belt retractor as defined in claim 8 wherein said spindle is rotatable about a spindle axis, said leaf spring extending longitudinally from said actuator member to said locking pawl in a direction generally parallel to said spindle axis.

11. A seat belt retractor comprising:
    a rotatable spindle from which a seat belt is unwound during extension of the seat belt and around which the seat belt is wound during retraction of the seat belt;
    a ratchet wheel connected to said spindle for rotation therewith;
    a locking pawl movable from a disengaged position to an engaged position engaging said ratchet wheel to block rotation of said spindle in the unwinding direction;
    a rotatable cam member;
    gear means for rotating said cam member at a speed which is less than the speed of rotation of said spindle during rotation of said spindle;
    an actuator member movable by said cam member from an unactuated position to an actuated position in response to a predetermined amount of rotation of said spindle in the unwinding direction, said actuator member being movable by said cam member from its actuated position to its unactuated position in response to rotation of said spindle in the unwinding direction; and
    spring means for moving said locking pawl into engagement with said ratchet wheel upon movement of said actuator member into said actuated position, said spring means including a spring interposed between said actuator member and said locking pawl, said spring engaging said actuator member and said locking pawl to move said locking pawl upon movement of said actuator member.

12. A seat belt retractor as set forth in claim 11 further including detent means having a first portion for engaging said actuator member and holding said actuator member in its unactuated position and a second portion for engaging said actuator member and holding said actuator member in its actuated position.

* * * * *